Oct. 31, 1933.  D. GRACE  1,933,054
MAP AND INDICATOR
Filed July 18, 1930  2 Sheets-Sheet 1
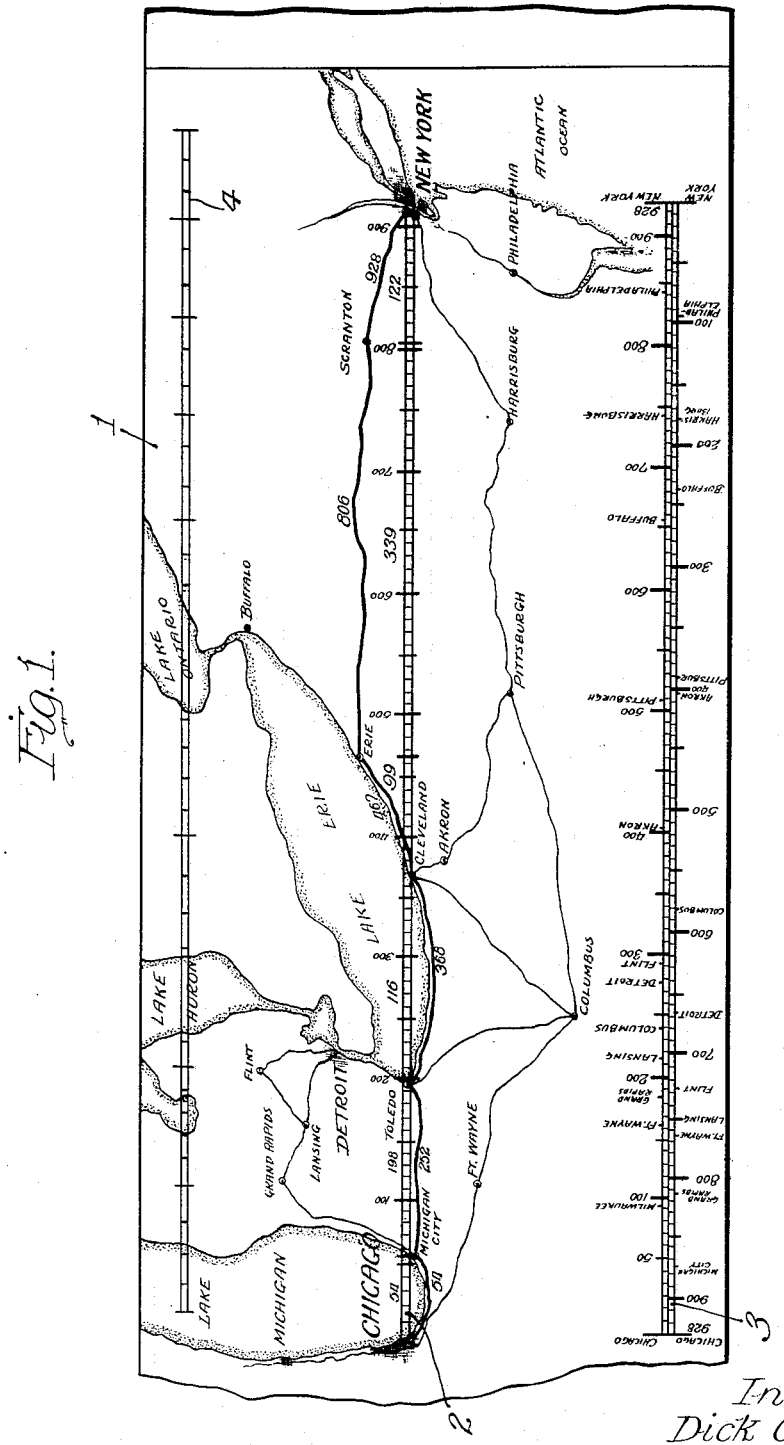
Inventor:
Dick Grace
By: *[signature]*
Attys.

Oct. 31, 1933.   D. GRACE   1,933,054
MAP AND INDICATOR
Filed July 18, 1930   2 Sheets-Sheet 2
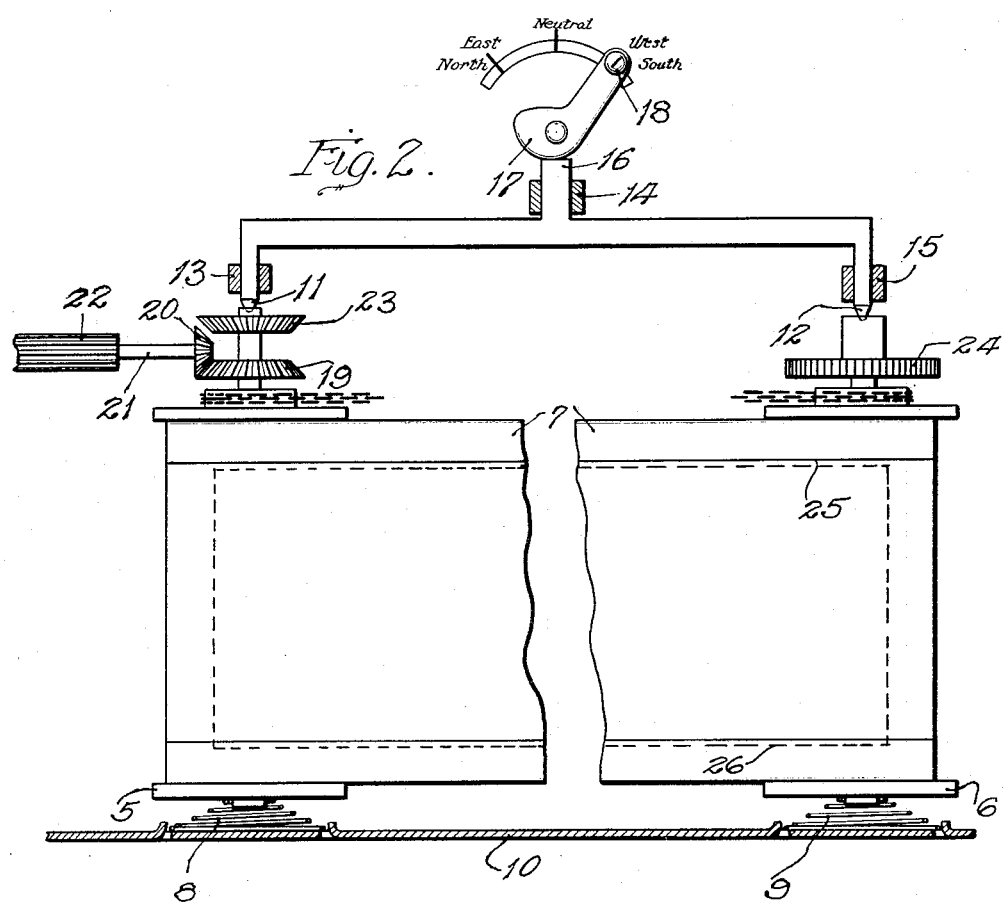
Inventor:
Dick Grace Patented Oct. 31, 1933

1,933,054

UNITED STATES PATENT OFFICE 1,933,054

MAP AND INDICATOR

Dick Grace, Chicago, Ill.

Application July 18, 1930. Serial No. 468,865

2 Claims. (Cl. 40—42)

My invention relates, generally speaking, to road and direction indicators for land, air and water vehicles, and is particularly concerned with novel maps, charts, and means for displaying the same.

It will be seen from the following specification, that my novel map is constructed by distorting the distances and locations in accordance with, and conforming to, an ideal course. The advantages which I obtain by this expedient will be fully realized as the description progresses.

No disadvantages result from this distortion. It must be considered that the map is on a strip, approximately three inches wide and disposed between two suitably housed movable reels. A display opening, approximately 3x5 inches is provided. The map may be built to a scale ten miles to the inch or twenty miles to the inch, as desired. The territory which is visible through the display opening at any moment, is, therefore, so small as to make the distortion practically negligible, because it will not be noted as the map strip travels past the display opening.

The invention is shown in the drawings, in which:

Figure 1 represents a map strip embodying several features, e.g., a straight line (true distance course) connecting two points; the true road (contour course of the main route); and auxiliary margin scales showing distances to points located beyond the main route.

Figure 2 represents means and mechanism for moving the map strip transversely to the display casing by moving the reels axially. This control is combined with the direction control.

Referring now to Figure 1, the map shown in this figure may be printed on a suitable strip material designated by numeral 1. The scale may be about twenty miles to the inch. If desired, the scale may be angularly distorted, say, about forty miles to the inch vertically and twenty miles to the inch laterally in order to include a larger territory on the map. This distortion, as well as the scale are, of course, optional.

The straight line through the middle of the map designated by numeral 2 is prominently displayed, preferably in red color as indicated. This line connects, as is seen, the two principal points Chicago and New York irrespective of the true latitude of these points. This straight line represents the—"true distance course"— mentioned previously.

It shall be assumed that the most advantageous road connecting the two principal points is the road going through Michigan City, Toledo, Cleveland, Erie and Scranton. This main course or road is preferably shown in blue on the map. It deviates to the north and south from the straight true distance course, and for convenience sake I apply to this main course the name—"contour course"—.

The contour course is built around the true distance course as shown. The towns located on the contour course are tabulated on the true distance course by marks which are in alignment with the location of the towns on the contour course.

The mileage between any of these points is entered individually on the straight true distance course. For example, the distance between Chicago and Michigan City is 54 miles, between Michigan City and Toledo 198 miles, between Toledo and Cleveland 116 miles, etc. Accordingly, these distances are marked on the true distance course by the numerals 54, 198 and 116, etc. The corresponding mileage marks shown on the contour course are cumulative. They designate in each instance the total distance of a certain town from the starting point Chicago. Thus, Michigan City is 54 miles from Chicago; Toledo is 54 plus 198, that is 252 miles from Chicago; Cleveland is 54 plus 198 plus 116, that is 368 miles from Chicago. The various distances are entered on the contour course cumulatively throughout as will be seen from an inspection of the drawings.

At the lower margin of the map shown in Figure 1 is indicated a straight prominent line preferably in red color as indicated by numeral 3. This straight line extending longitudinally to the map strip at the margin thereof is merely a replica of the true distance course running through the middle of the map. It is in the nature of a graphic speedometer, comprising an upper and a lower portion. The upper portion shows a mileage scale extending from Chicago and ending in New York. Various towns are indicated at this mileage scale in their true distance relation from Chicago. Thus for example, Milwaukee is indicated on the scale as being 93 miles from Chicago; Fort Wayne is indicated on the scale as being 161 miles from Chicago; Grand Rapids is indicated as being 186 miles from Chicago. All towns shown on the map which are located off from the main road are thus indicated on this scale with their true distances from Chicago.

The lower portion of the scale is intended for use when travelling in reverse direction, that is, from New York to Chicago. All towns shown on the map located off from the main course are shown on the lower scale in their true distance relation from New York.

The towns located on the main road, that is, Michigan City, Toledo, Cleveland, Erie and Scranton, are not entered on the margin scale, since their relation and relative distances can be readily determined on the true distance course and on the contour course.

It will be understood, of course, that the margin scale as shown in Figure 1 and indicated by numeral 3 may be located at either side of the map strip longitudinally thereto. I have shown the mileage scale for both directions of travel on the lower side of the map strip merely for convenience sake and for illustrative purposes. It may be desirable in practice to locate one such margin scale at each side of the map, one serving only the west-east direction of travel and the other serving the east-west direction of travel. It is also possible to retain the scale indicated at 3 and to provide another scale 4 at the other side of the strip for indicating corresponding information for another predetermined principal route. The scale 4 is indicated schematically.

The map contains in reality an appreciable number of smaller towns and their distances.

The true distance course is subdivided, in the nature of a scale, and may be directly entered on the true distance course as shown, or may be provided in form of a transparent scale on the display glass. In either case, the subdivision will indicate to the traveler the exact mileage in addition to the accurate location of the vehicle with relation to the road on which he is travelling.

The map may be suitably carried on a display device mounted on the instrument board of a vehicle in back of a display opening having a sight and a hair-line. The device may be set for operation by suitable means so that the reels transport the map past the hair-line. The reels may be actuated from the speedometer or in another suitable manner.

The map will move in accordance with the speed of the vehicle to the left from the hair-line. The scale on the true distance course will indicate to the traveler the mileage at any moment. At the same time, the hair-line will also indicate his location on the contour course. This provides not only an excellent direction control and indication, but also a check for the speedometer.

While travelling on the main course, the motorist may disregard the auxiliary scales at the bottom and top of the map. However, should he desire to travel to any town located on the map beyond, that is to say, below or above the main route, he will entirely disregard the main route and use the map merely for guiding him on the right road as he would use any other ordinary map. The hair-line will indicate to him, on the corresponding auxiliary margin scale, the distance travelled and will also indicate the neighboring towns and the town of destination.

A marginal scale may be provided on either side of the map strip longitudinally thereto, each side reserved for another principal travel direction. In other words, each margin of the map strip may be provided with an auxiliary scale, one scale furnishing the information for one principal travel direction and the other scale furnishing the information for the other travel direction. Whether the one or the other modification is used, that is to say, whether the two marginal scales are divided and put separately on the margins of the map strip or combined, it will be convenient in either case to expose only that marginal scale which is of interest to the traveler when travelling in a certain direction. Therefore, one of the marginal scales must in either case be covered. This may be done in a manner as I have shown in Figure 2.

Referring now to Figure 2, the reels 5 and 6, carrying the map or chart strip 7 are movable in an axial direction. Springs 8 and 9 disposed suitably within the frame member 10 are adapted to exert an even pressure on the corresponding reels 5 and 6 to hold these reels movable and rotatable within the point bearings 11 and 12. The point bearings 11 and 12 are provided on extensions of a lever which is adapted to move within bearings 13, 14 and 15. This lever has an extension 16 which is adapted to be operated by a cam 17 combined with the direction control lever 18. In the position shown, the control lever 18 is adjusted to the west-south direction. It will be seen that the bevel gear 19 on the reel 5 meshes now with the bevel gear 20 provided on the shaft 21 which also carries the shaft gear 22. This gear 22 may be operated either by a suitable gear arrangement mechanically from the speedometer or it may be provided by suitable electrically controlled mechanism.

In the position shown in Figure 2 the motion transmitted to the gear 22 will be further transmitted to the bevel gear 19 and will move the reels 5 and 6 in a definite direction, in this instance in the west-south direction, transporting the map or the chart.

When it is desired to disengage the bevel gear 20 from engagement with either the gear 19 or the gear 23 the direction control lever 18 will be moved to neutral position actuating the cam 17, which in turn depresses the extension 16 and moves the bearing points 11 and 12 to depress the corresponding shafts of the reels 5 and 6 against the pressure of the springs 8 and 9. In neutral position the knob 24 may be actuated in a well known manner to align the map or the chart relative to the hair-line on the indicator.

When the direction lever 18 is moved to the extreme left, which is the east-north direction of the device, the cam 17 will depress the extension 16 further, thereby moving the bearing points 11 and 12 and depressing the reels 5 and 6 so that the bevel gear 23 will engage and mesh with the bevel gear 20 on shaft 21. In this latter position, the device is adapted to transport the map or the chart in the reverse direction.

By moving the map strip up or down within the display opening, in the manner discussed above, one or the other of the marginal scales 25 or 26 will be covered by the frame of the device, leaving only one marginal scale exposed to view. The scale exposed is, of course, the one which is needed for guiding the traveler in the direction in which he travels.

The two marginal scales are shown in full lines on the strip and the sight opening is shown in dotted lines, and it will be seen that the sight opening is so positioned that one marginal scale is visible while the other is covered by the casing.

It will be apparent that other modifications may suggest themselves and may be carried out within the scope and spirit of the teachings of my invention. I, therefore, want to have it understood that I do not desire to limit myself to the precise embodiment of the invention as shown in the drawings and described in the foregoing, but that I intend to use and to apply the invention subject only to the limitations of the appended claims in which I have defined what I believe new and distinguishing in the art.

I claim:

1. A route and distance indicating device for a moving vehicle, comprising a movable strip, route and distance information disposed on said strip, stationary indicating means, means for manually moving said strip to adjust the same relative to said indicating means, control means for determining the direction of movement of said strip, means actuated by said control means for covering certain portions of said strip while exposing other portions, and means for automatically moving said strip in the direction determined by said control means, said automatic motion of said strip being in accordance with the speed of the vehicle and transporting said strip past said stationary indicating means to denote the location of the vehicle and the mileage.

2. An indicating device for moving vehicles, comprising a strip containing travel information, rotatable reels for movably supporting said strip, means for manually rotating said reels, means for automatically rotating said reels in accordance with the speed of travel, said strip moving past a sight opening, and means for axially moving said reels with said strip to adjust said strip laterally with respect to said sight opening.

DICK GRACE.